May 13, 1930.  W. B. ROSEVEAR  1,758,128
METHOD FOR PROPAGATING SUGAR BEETS
Filed March 16, 1929

Inventor,
William B. Rosevear,
By Owen & Owen,
Attorneys

Patented May 13, 1930

1,758,128

UNITED STATES PATENT OFFICE

WILLIAM B. ROSEVEAR, OF TOLEDO, OHIO

METHOD FOR PROPAGATING SUGAR BEETS

Application filed March 16, 1929. Serial No. 347,642.

This invention relates to a method of propagating sugar beets, which involves the planting of the seed in boxes in a cold frame or the like, several weeks earlier than the usual date for planting out of doors and later transplanting the young plants to the field where the beets are grown.

Hitherto it has been generally regarded as impractical, if not impossible, to transplant small sugar beet plants successfully, due to the extremely delicate and fragile nature of the tap root, which, if it becomes broken, causes the beet to grow clumpy, thereby rendering it quite unprofitable as a source of beet sugar.

With such conditions in mind, the primary object of the present invention is to provide a method and means for propagating the young plants in such a manner that they may be transplanted expeditiously and without injury, thereby gaining various advantages over the usual method of planting the seed in the field without any of the disadvantages heretofore encountered in all attempts which have been made to transplant them.

Figure 1:
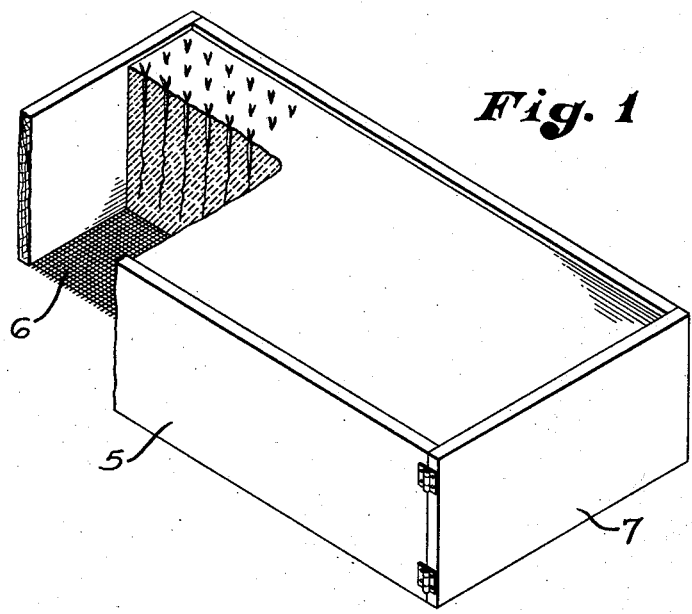

My improved method, together with various accessories particularly adapted to be used in carrying out such method, will be more fully described in connection with the accompanying drawings, in which Figure 1 is a perspective view of a box containing a prepared seed bed, parts being broken away.

Figure 2:
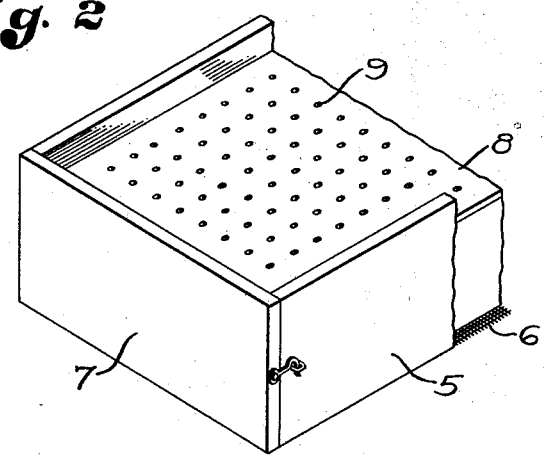

Figure 2 is a similar view illustrating the method of distributing the seed uniformly in the bed.

According to my improved method, the seed bed is prepared in a box 5, which is preferably rectangular and which may be placed within a cold frame of usual construction. The box 5 has a foraminous bottom 6, composed of some suitable metal or alloy which will not rust and which may be formed of woven wire or in any other suitable manner. One end of the box, as indicated at 7, is hinged or otherwise arranged so that it may be opened. The walls of the box may be braced by any suitable means to secure a strong and substantial construction.

The preferred method of preparing the seed bed is to first fill the box with dirt to within an inch or so of the top, so that when the seed is laid on the surface of the dirt and the filling of the box completed, the seed will be covered to the proper depth. In planting the seed, it is convenient to use a distributing plate 8, which has a thickness substantially equal to the diameter of the seed and which is formed with numerous equidistant holes 9, each hole being large enough to receive one seed only. The dimensions of the plate are such that it will substantially cover the seed bed. When the plate 8 has been laid on the seed bed as shown in Figure 2, seed is poured upon the same and spread around until all of the holes 9 are filled. The surplus seed is then scraped off. The plate is then removed and sufficient dirt is added to cover the seed to the proper depth. The provision of the foraminous bottom 6 has a threefold purpose. It permits irrigation of the seed bed through the bottom of the box from the ground on which the box rests. It permits inspection from beneath when the box is lifted, in order to determine the proper time for transplanting, which should be about the time when the tap roots reach the bottom of the box. It also permits the dirt to be washed away from the roots of the plants through the bottom of the box so that the plants may be easily separated from each other without injuring the same.

In transplanting, the end 7 is opened and water sprayed against the end of the seed bed. Beginning at one end thereof the dirt is progressively washed away from the roots of the plants, as the latter are prepared for transplanting. The plants are then laid on a moist surface, of paste-board, cloth or other absorbent material which may be saturated with water, so that the roots are prevented from drying out until they are again covered with dirt. The field is prepared by opening V-shaped furrows, one side being very slightly inclined so that the young plants may be laid thereon in substantially up-right position. The furrow is then closed and the dirt pressed firmly about the roots.

In propagating beets according to the above described method, there is a saving of a very large proportion of the seed usually required. The plants are set uniformly at equal distances apart so that no blocking or thinning of the plants is necessary in the field. A uniform stand and spacing is obtained with a resultant increase in yield of forty to sixty percent over the yield obtained by the usual methods. The average sugar content is greater because the beets are not disturbed or broken at any time during their growth. The matured beets are therefore uniform in shape, which facilitates the cutting of the same at the factory and enables the grower to obtain the maximum price. The factory may start operation at least thirty days earlier than the usual time since the beets, started in a cold frame and set out in the field when the season permits, mature much earlier than when planted in the open ground.

While I have described specifically the various steps of the process and the various accessories used in carrying out the same, it is to be understood that these may be varied considerably in repect to various details, without departing materially from the scope of the invention as claimed.

What I claim is:

1. The process of raising tap-root seedlings, comprising planting the seed in an above-ground earth filled bed, and washing the earth from the roots while in the bed when the seedlings have grown sufficiently for transplanting.

2. The process of raising tap-root seedlings, comprising planting the seed in an above-ground earth filled bed, and progressively washing the earth from the roots when the seedlings have grown sufficiently for transplanting.

3. The process of raising tap-root seedlings, comprising planting the seed uniformly in close relationship in an above-ground earth filled bed, and washing the earth from the roots while in the bed when the seedlings have grown sufficiently for transplanting.

4. The process of raising tap-root seedlings, comprising planting the seed uniformly in close relationship in an above-ground earth filled bed, and progressively washing the earth from the roots when the seedlings have grown sufficiently for transplanting.

In testimony whereof I have hereunto signed my name to this specification.

WILLIAM B. ROSEVEAR.